United States Patent Office 2,709,197
Patented May 24, 1955

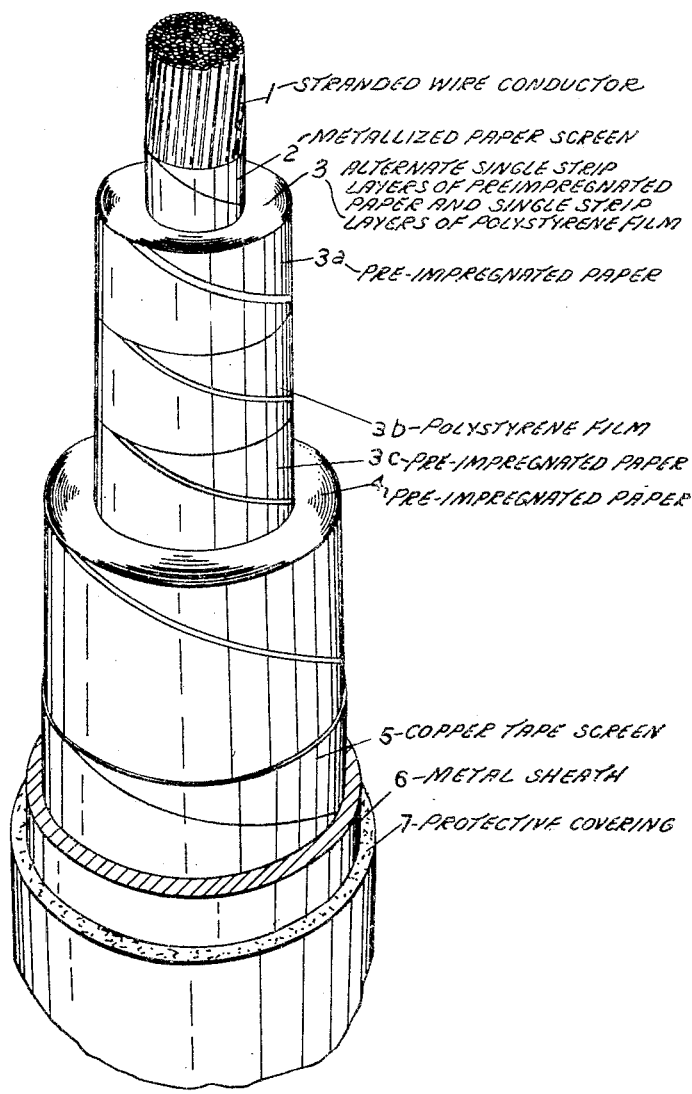

2,709,197

ELECTRIC CABLES

Edward Leslie Davey, Hale, England, assignor to W. T. Glover & Company Limited, Manchester, England, a British company Application September 27, 1950, Serial No. 187,041

Claims priority, application Great Britain October 13, 1949

3 Claims. (Cl. 174—25)

In the specification of our prior patent application No. 40,450, now abandoned, we have described and claimed a supertension electric cable having a lapped dielectric built up of an inner part consisting of oriented polystyrene and an outer part of pre-impregnated paper. The wall thickness of the oriented polystyrene portion lies within a range whose lower limit is equal to 10% of of the radius of the conductor surface with a minimum thickness of fourteen lappings and whose upper limit amounts to 45% of the radial wall thickness of the whole dielectric. Under operating conditions the interstices of both parts of the cable are filled with gas under super-atmospheric pressure.

In the aforesaid application it is stated that the characteristics of the cables are substantially modified by the combination of the two dielectric materials, that considerable advantages are obtained as regards surge breakdown strength, reduced losses and reduced capacitance. With the object of obtaining a cable of high surge breakdown strength suitable for operating at line voltages at the lower end of the super-tension range, that is more economical than is the cable described and claimed in the aforesaid application when used for such voltages, we provide by the present invention a modified form of the cable there described. In this modified form of cable the dielectric of the conductor (or of each conductor) comprises an inner part built up in part of oriented polystyrene film and an outer part of preimpregnated paper, the interstices of both parts being filled with an immobile insulating compound, that is to say, with insulating compound which does not flow at any temperature within the working range of the cable, and the inner part having a wall thickness lying within a range whose lower limit is equal to 10% of the radius of the conductor surface and whose upper limit amounts to 45% of the radial wall thickness of the whole dielectric, and including not fewer than fourteen layers.

In the modified form of cable the amount of polystyrene film used to build up the inner part of the dielectric may and usually will be less than that required in the cable described and claimed in the specification of application No. 40,450 and the filling of the interstices with insulating compound instead of with gas at super-atmospheric pressure dispenses with the need to reinforce the cable sheath or other metal envelope in which the cable is enclosed, so that a cheaper cable results.

The compound in the interstices in the lapped body of the dielectric is necessarily introduced while it is at a temperature above its set point. In cooling in situ in the lapped body of dielectric the compound will contract. This will probably result in the production of very small void spaces in the compound. Accordingly the term "filled" as applied to the interstices between the strips must be construed as taking into account the presence of such void spaces.

The materials used for the filling compound are preferably such as have a well defined set point and are sufficiently soft at normal temperatures to permit the small relative movements between adjacent turns and layers of insulating material which are necessary when the cable is bent under manufacturing and laying conditions. Suitable materials are resinous compounds, petroleum jellies and similar materials having set points of 60° C. or higher as determined by the ball and ring method, the value chosen being determined by the maximum operating temperature of the cable. It is preferred to use materials which liquefy at a sufficiently low temperature to allow the lapping on to the conductor of the strips of oriented polystyrene film and of pre-impregnated paper to be carried out in a trough containing the material in a liquid state.

In the aforesaid specification we have indicated that a coating of lubricant such as an oil or petroleum jelly may be applied to the surfaces of the strips of polystyrene film before they are wrapped on in place in the cable. This coating ensures sufficient freedom of relative movement between the superposed layers of polystyrene film for the normal bending of the cable during the subsequent manufacturing stages and during the laying operation.

We have found that such a coating of lubricant may not always suffice to prevent the sticking together of the strips of polystyrene film after the cable has been put into service. The temperature developed in the cable conductor or conductors when the cable is under load tends to cause the neighboring strips of polystyrene film to stick together despite their initial separation by a film of lubricant. The reduction in the flexibility of the cable caused by the sticking together of the strips of polystyrene film is not of material consequence after the cable has been installed unless the installation is only temporary. However the sticking together of the strips of polystyrene film has the disadvantage that gaps having larger radial dimensions than those corresponding to the radial thickness of the strips are liable to be formed. Such gaps reduce the electrical efficiency of the dielectric.

In our modified form of cable, the presence of the filling compound lowers the thermal resistivity of the dielectric wall and permits of some reduction in the temperature of the dielectric under operating conditions. This reduction is small and may not materially lessen the risk of sticking together of the strips of oriented polystyrene film of which the inner part of the dielectric built up and therefore, in accordance with a further feature of our invention we eliminate such sticking or at least reduce it to a considerable extent by building up the inner part of the dielectric of alternate single strip layers of oriented polystyrene film and layers, preferably single strip layers, of pre-impregnated paper. As a result each strip of polystyrene film is separated from each of its neighboring strips of polystyrene film by pre-impregnated paper. By pre-impregnated paper we mean paper impregnated before the lapping process with a cable impregnating compound that does not flow at any temperature within the working range of the cable.

The radial wall thickness of the inner part of the dielectric may be determined in the manner described in the aforesaid application No. 40,450, that is to say, a comparison may be made between the saving as regards the no-load kva. of the cable due to the use of the polystyrene material which is a material having a low permittivity and a low loss factor and the substantially higher cost involved in using polystyrene in place of pre-impregnated paper, to obtain an optimum result, providing it is borne in mind that the radial thickness of the inner part must not be so great that, during lead covering or plumbing of the lead sheath of the cable, damage can occur to the outermost layers of oriented polystyrene by excessive heat transmitted through the outer pre-impregnated paper part of the dielectric. From the point of view of avoiding damage to the polystyrene films in the inner part of the dielectric it has been found satisfactory to make the maximum value of the thermal resistance of the paper interleaved oriented polystyrene part of the dielectric wall equal to 40% of that of the thermal resistance of the whole dielectric wall.

The accompanying drawing shows by way of example the stepped end of a length of single core cable having a dielectric built up in accordance with the invention. This cable is designed for a working voltage of 33 kv. between the conductors of a 3-phase A. C. transmission system. It comprises a stranded conductor 1 of which the circumferentially disposed wires are flattened as by drawing the conductor through a die, the diameter of the drawn conductor being 2.0 cms. Surrounding the conductors is a screen of metallised paper 2 giving it an effective external radius of 1.008 cms. and a substantially smooth surface in contact with the surrounding dielectric. The latter consists of an inner part 3 and an outer part 4. The inner part 3 consists of alternate single strip layers of pre-impregnated paper of 3.5 mils (0.009 cm.) thickness and oriented polystyrene film of 3.5 mils (0.009 cm.) thickness built up to an external radius of 1.135 cms., the first layer being formed by a lapping of polystryrene film, the next by a lapping of paper, the third by a lapping of polystyrene film and so on or vice versa. Of the three single strip layers exposed, layers 3*a* and 3*c* are of pre-impregnated paper and layer 3*b* is of polystyrene film. The outer part 4 of the dielectric is built up entirely of helical strips of pre-impregnated paper to a radius of 1.565 cms. Over the outer part of the dielectric is a screen formed by a helical lapping of copper tape 5 three mils thick applied with a 10–20% overlap. The interstices in the screened core are filled with a filling compound of the kind described and the core is enclosed in a metal sheath 6, e. g. a lead, lead alloy or aluminium sheath, which may be enclosed by a corrosion protective covering 7.

When the example of cable described above operates at a line voltage of 33 kv. the stresses in the various parts of the dielectric are as follows:

| | Kv./cm. |
|---|---|
| At the conductor surface—in the polystrene | 60 |
| At the conductor surface—in the pre-impregnated separator | 40 |
| At the outside of the inner part of the dielectric—in the polystyrene | 53.3 |
| At the outside of the inner part—in the paper | 35.5 |
| At the inside of the outer part | 35.5 |
| At the outer surface of the outer part | 25.7 |

It will be perceived from the working stresses given above that the cable is surge resistant to a high degree in that it may be subjected to a surge stress at the conductor surface approaching 1200 kv./cm. without the surge breakdown strength of the polystyrene (1250 kv./cm.) or that of the pre-impregnated paper (800 kv./cm.) being reached in any part of the dielectric.

It is to be understood that although the example described is an example of a single core cable, the invention is also applicable to multicore cables and that in fact the design described by way of example can, as regards the construction of cable conductors and dielectric, be used for 3-core screened cable or 3-core separately lead covered cable, and the design of dielectric can be used for the dielectrics of conductors of oval or "sector" shape.

What I claim is:

1. A super-tension cable comprising a conductor, a plurality of helical lappings of insulating material on said conductor forming an intersticed laminated body of dielectric surrounding said conductor and comprising an inner part built up of alternate single-strip layers of oriented polystyrene film and layers of pre-impregnated paper and an outer part of pre-impregnated paper, said inner part comprising at least fourteen layers and having a radial wall thickness of not less than 10% of the radius of the conductor and not more than 45% of the combined radial wall thickness of said inner and outer parts, a fluid-impervious enclosure surrounding said body of dielectric, and liquifiable insulating compound which is soft but immoble at any temperature within the working range of the cable in the interstices in both parts of said laminated body.

2. A super-tension cable comprising a conductor, a plurality of helical lappings of insulating material on said conductor forming an intersticed laminated body of dielectric surrounding said conductor and comprising an inner part built up of alternate single-strip layers of oriented polystyrene film of which the thickness is about 3.5 mils and layers of pre-impregnated paper of which the thickness is about 3.5 mils and an outer part of pre-impregnated paper, said inner part comprising at least fourteen layers and having a radial wall thickness of not less than 10% of the radius of the conductor and not more than 45% of the combined radial wall thickness of said inner and outer parts, a fluid-impervious enclosure surrounding said body of dielectric and liquifiable insulating compound which is soft but immobile at any temperature within the working range of the cable in the interstices in both parts of said laminated body.

3. A super-tension cable comprising a conductor, a plurality of helical lappings of insulating material on said conductor forming an intersticed laminated body of dielectric surrounding said conductor and comprising an inner part built up of alternate single-strip layers of oriented polystyrene film and single-strip layers of pre-impregnated paper and an outer part of pre-impregnated paper, said inner part comprising at least fourteen layers and having a radial wall thickness of not less than 10% of the radius of the conductor and not more than 45% of the combined radial wall thickness of said inner and outer parts, a fluid-impervious enclosure surrounding said body of dielectric, and liquifiable insulating compound which is soft but immobile at any temperature within the working range of the cable in the interstices in both parts of said laminated body.

References Cited in the file of this patent

UNITED STATES PATENTS

| 2,067,169 | Beaver et al. | Jan. 12, 1937 |
| 2,102,974 | Robinson | Dec. 21, 1937 |
| 2,289,734 | Scott et al. | July 14, 1942 |
| 2,309,992 | Scott et al. | Feb. 2, 1943 |

OTHER REFERENCES

Matheson et al.: J. Ind. and Eng. Chem., March 1939, page 336. Copy in Scientific Library.